US007425086B2

(12) United States Patent
Murphy

(10) Patent No.: US 7,425,086 B2
(45) Date of Patent: Sep. 16, 2008

(54) DOCK LIGHT

(75) Inventor: Robert J. Murphy, Delaware, OH (US)

(73) Assignee: Moon River Docks LLC, Delaware, OH (US)

( * ) Notice: Subject to any disclaimer, the term of this patent is extended or adjusted under 35 U.S.C. 154(b) by 154 days.

(21) Appl. No.: 11/546,191

(22) Filed: Oct. 11, 2006

(65) Prior Publication Data

US 2008/0089057 A1 Apr. 17, 2008

(51) Int. Cl.
*B60Q 1/00* (2006.01)
*F21V 1/00* (2006.01)

(52) U.S. Cl. ........................ 362/477; 362/158; 362/267

(58) Field of Classification Search ................. 362/477, 362/145, 253, 267, 800, 363, 158, 311, 153, 362/645, 183; 441/13, 16–18; 405/219
See application file for complete search history.

(56) References Cited

U.S. PATENT DOCUMENTS 5,281,055 A 1/1994 Neitzke et al.
7,207,701 B2 * 4/2007 Kennedy et al. ............ 362/477
2001/0026453 A1 * 10/2001 Wiggerman et al. ......... 362/477

* cited by examiner

*Primary Examiner*—Bao Q Truong
(74) *Attorney, Agent, or Firm*—Jason H. Foster; Kremblas, Foster, Phillips & Pollick

(57) ABSTRACT

A dock light for mounting in a void in the side of a floating dock. The light has a housing with a floor, sidewalls, lens and lid defining a chamber. The chamber houses a power source, such as a battery and photovoltaic cell, and a light source, such as a light emitting diode (LED). The lid is removably mounted to the sidewalls, and is flush with, or set beneath, the top surface of the dock when in an operable position. The lens extends from the void at a side opening when the dock light is in an operable position, and is flush with, or set beneath, the side surface of the dock. The light shines from the side of the dock, and is powered by collecting energy from the sun, thereby requiring little to no maintenance. The dock light is protected by the surrounding surfaces of the dock.

12 Claims, 5 Drawing Sheets

DOCK LIGHT

BACKGROUND OF THE INVENTION

1. Field of the Invention

This invention relates generally to docks over adjacent bodies of water, and more particularly to accessories for floating docks.

2. Description of the Related Art

Boaters and other water enthusiasts construct docks in order to attach boats to structures adjacent the land. This enables boaters to enter and exit their boats from dry land over a solid structure, and ensures that the boat will remain in place after it has been attached to the dock.

Traditional docks are formed from vertical posts driven into the floor of the body of water, and horizontal members attached to and extending between the posts. The horizontal members form a deck upon which boaters walk, and the vertical members form the foundation which supports the deck and keeps the deck in place against the force of the tide, moving boats, freezing water, etc. More recently, hollow floating docks have been constructed in order that the dock can be placed upon the water's surface and attached to shore, such as by a chain, rope, cable or other tether. This permits the docks to be removed during inclement weather and in the off-season. Such a dock is described in U.S. Pat. No. 5,281,055 to Neitzke et al., which is incorporated herein by reference.

The Neitzke et al. patent discloses a hollow dock that is made up of separate sections connected together. Each section has sockets formed on its upper and lower edges, and the sockets are voids having a wide inner region, and a narrow outer region. Complementary anchors are inserted in the voids to connect the sections together in the manner of modular units, thereby making the dock as large as desired.

Traditional docks that are permanently mounted in place can be wired for electrical power so that the boat's electrical system can be plugged into a power source during docking to recharge a battery, for example. Additionally, the electrical power can be used to power lights to make the dock visible in foggy or low-light conditions. Floating docks have a distinct disadvantage inasmuch as if the user must purchase special accessories for the dock if he or she wishes to wire the dock for lights. Because floating docks are usually closer to the surface of the water than permanent docks, floating docks can be difficult to see in foggy and low-light conditions. Additionally, placing high voltage wiring close to the water could be viewed as dangerous. Finally, some floating docks, such as swimming platforms, float in a body of water far from shore, making lighting the dock using traditional wired lighting essentially impossible.

The need exists for a light for floating docks that does not have the disadvantages of the prior art.

BRIEF SUMMARY OF THE INVENTION

The invention is a dock light for mounting into a void in a floating dock. The void in one embodiment is a socket on the side of a dock. The void has a top opening in a dock floor and a side opening in a dock sidewall. The dock light includes a housing for mounting into the dock void. The housing has walls defining an internal chamber and the walls include a translucent lens for extending into the side opening of the void with at least the lens visible. The housing also includes a top wall for extending into the top opening of the void and sidewalls that are substantially wider than the lens for preventing the housing from passing through the side opening. A light source, such as a light emitting diode (LED) is mounted in the internal housing chamber adjacent the lens and a power source is mounted in the internal housing chamber and electrically connected to the light source.

In a preferred embodiment, the sidewalls extend laterally from the lens in a first direction and in a second, opposite direction, thereby forming a widened back region opposite the lens to prevent the dock light from being removed from the void through the side opening. The power source can be a rechargeable battery electrically connected to a photovoltaic cell that is mounted beneath the top wall. In this embodiment, the top wall is translucent and removably mounted to the sidewalls. A switch, whether manually actuatable or automatic, can be mounted to the housing and electrically interposed between the power source and the light source. Such an automatic switch can include a switch that turns the light source on when there is insufficient light and off when there is sufficient light.

Figure 1:
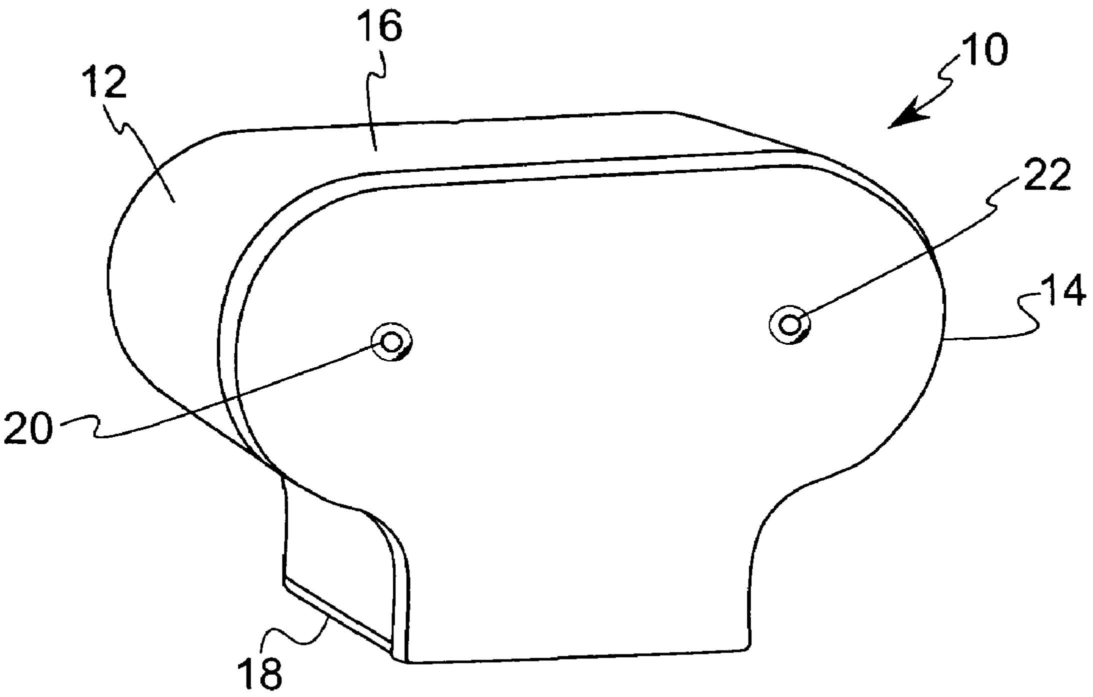
FIG. 1 is a view in perspective illustrating a preferred embodiment of the present invention with some of the contents of the chamber removed.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The dock light 10 is shown in FIG. 1 having a housing 12 that includes a lid 14, sidewall 16 and lens 18. These components can be made of any suitable material, including plastic, composite, metal or any combination. The components are preferably made of polycarbonate, polyvinyl chloride (PVC) or some other durable plastic. The sidewall 16 has a curved configuration and extends from one side of the lens 18 entirely around the peripheral edge of the lid 14 to the opposite side of the lens 18. The sidewall 16 and lens 18 define the lateral boundaries of an internal chamber 40 (see FIG. 4) in which electronic components, described below, are housed.

The lens 18 can be formed integrally with the sidewall 16 or it can be removably mounted. Preferably the lens 18 is a transparent plastic panel, but the lens 18 can be translucent or colored, or both. Furthermore, it is possible to form textured surfaces on the lens 18 in order to direct light in one or more directions, or to form patterns, such as arrows.

Figure 2:
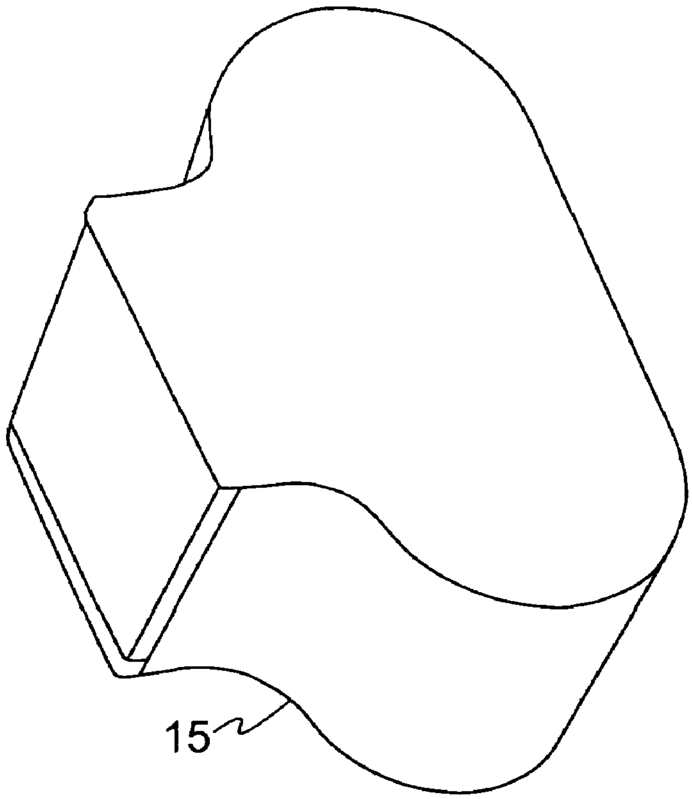
FIG. 2 is a view in perspective illustrating the underside of a preferred embodiment of the present invention with some of the contents of the chamber removed.
Figure 9:
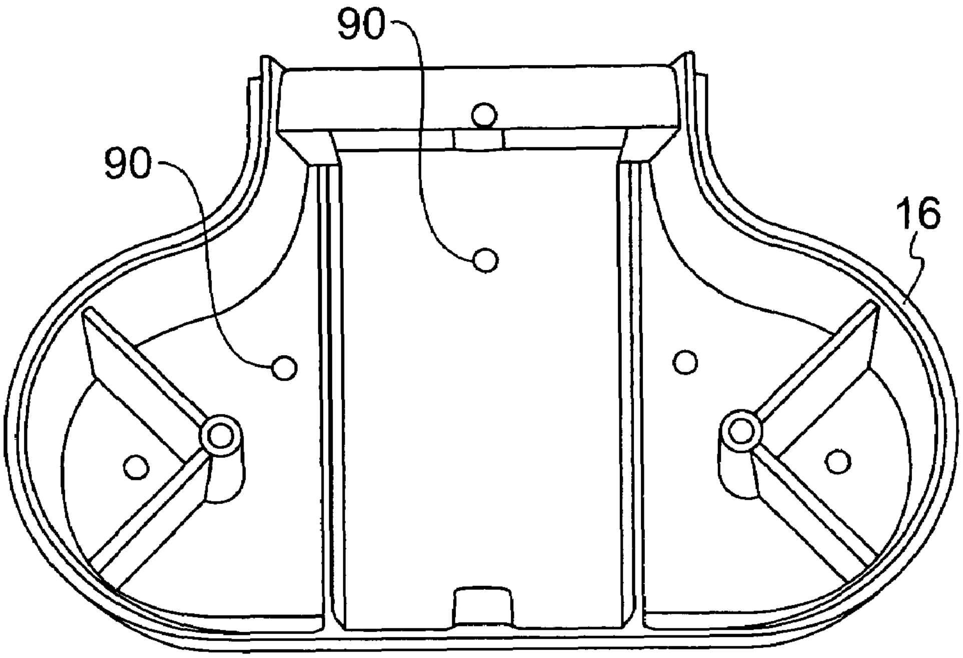
FIG. 9 is a view in perspective illustrating the preferred embodiment of the invention with the lid and some of the contents of the chamber removed.

The floor 15 (see FIG. 2) is preferably integral with the sidewall 16 at the floor's peripheral edge, and defines the lower limit of the internal chamber when the housing 12 is in an operable orientation. The sidewall 16 forms a right angle at its juncture with the floor 15, and apertures 90 are formed in the floor 15 as shown in FIG. 9 in order that any water that enters the chamber 40 can easily drain through the apertures 90.

Figure 3:
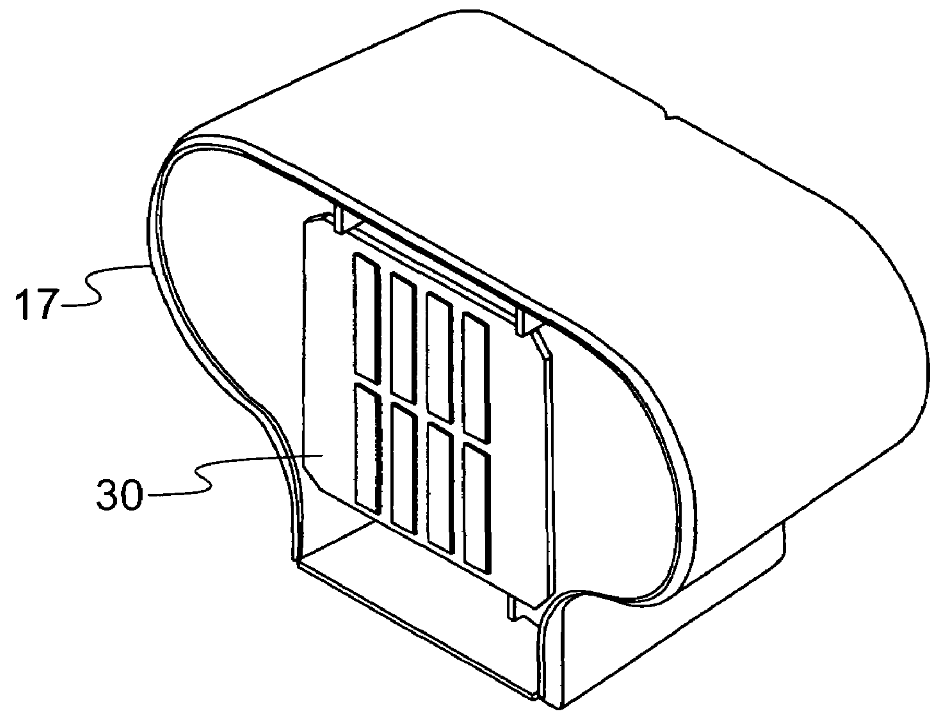
FIG. 3 is a view in perspective illustrating a preferred embodiment of the present invention with the lid and some of the contents of the chamber removed.

The lid 14 is attached on the opposite edge of the sidewall 16 from the floor 15, preferably by a pair of screws threaded through the apertures 20 and 22. Of course, any conventional fastener can be substituted for screws, including but not limited to specialty clips, magnets and adhesives. The lid 14 defines the upper limit of the internal chamber 40 when the housing 12 is in an operable orientation, and is removably fastened in order to access the internal chamber 40. Most preferably, a gasket (not shown) is interposed between the lid 14 and the lip 17 (see FIG. 3) of the sidewall 16, such as in a groove formed in the lid 14, in order to seal the internal chamber 40 from infiltration of water or air. In the preferred embodiment, the lid 14 is transparent, but it could be translucent and/or colored. A photovoltaic cell 30 (FIG. 3), which is one element of the preferred power source, is mounted on the top of the internal chamber 40, just beneath the lid 14. The cell 30 faces outwardly of the chamber 40 and operates in a conventional manner to collect sunlight and generate electrical energy.

Figure 4:
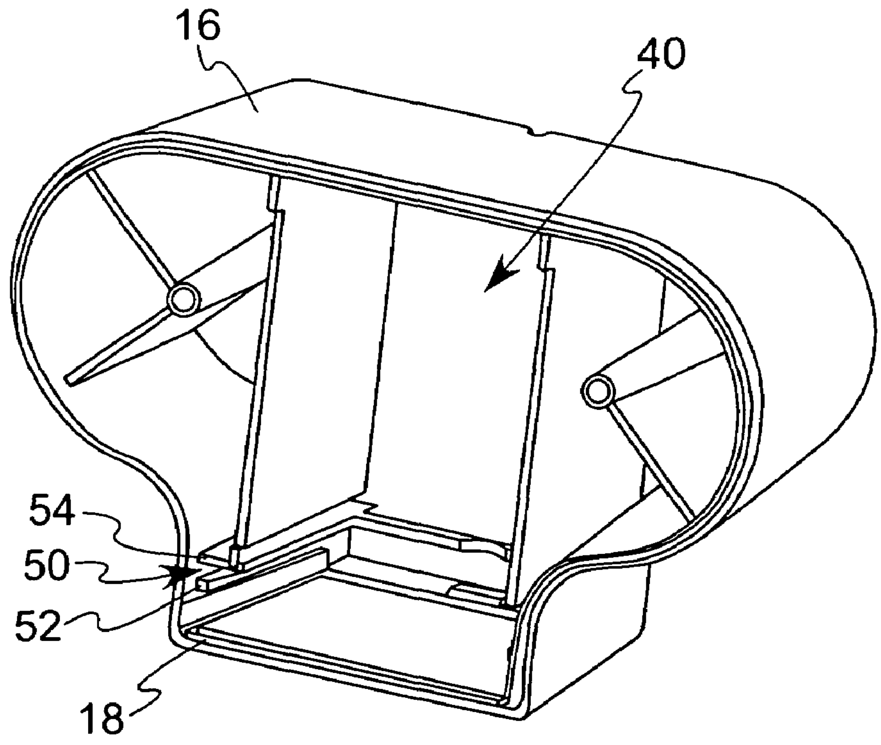
FIG. 4 is a view in perspective illustrating a preferred embodiment of the present invention with a photovoltaic cell and the remaining contents of the chamber removed.
Figure 5:
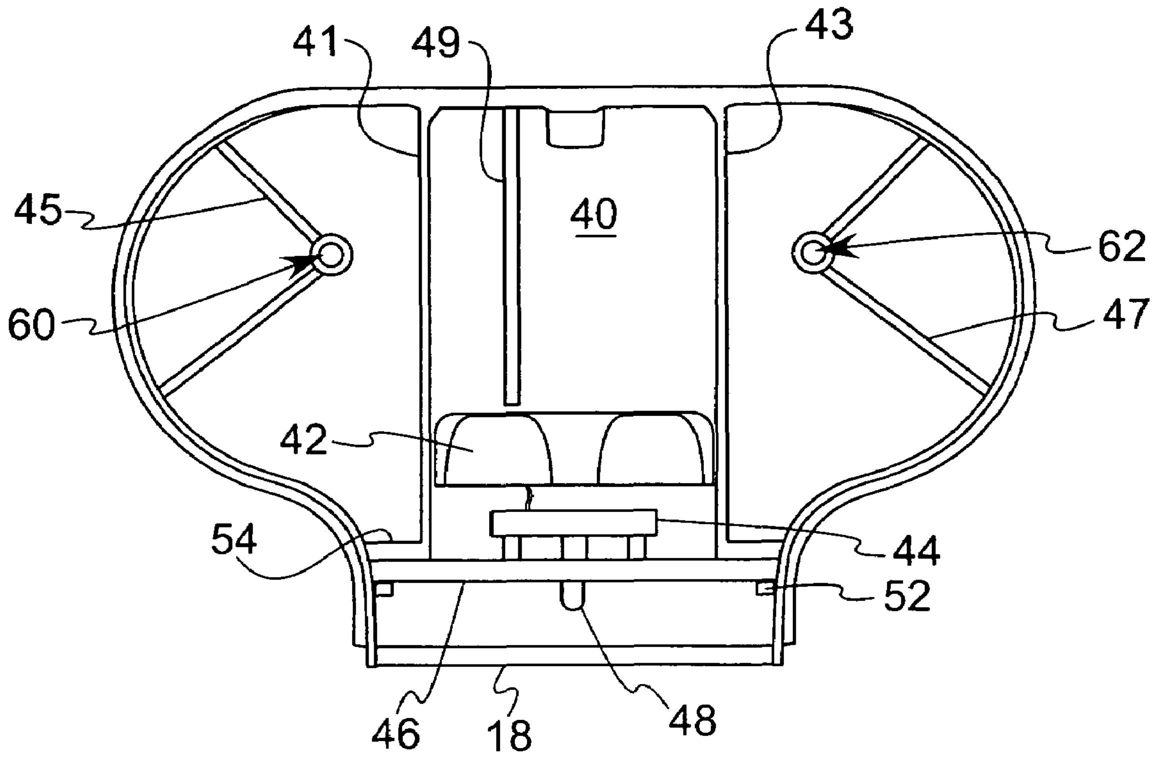
FIG. 5 is a top view illustrating the preferred embodiment of the present invention with the contents of the chamber positioned in their preferred locations.

As shown in FIGS. 4 and 5, the internal chamber 40 is beneath the cell 30, and the internal chamber 40 houses the remaining elements of the preferred power source of the light 10, which is a rechargeable battery 42 connected to an electronic circuit panel 44 that controls the electrical energy generated by the cell 30. A rigid panel 46 to which the electronic circuit is mounted is removably inserted with its edges in the groove 50 formed between the ribs 52 and 54. The light emitting diode (LED) 48 extends from the circuit panel 44 through the rigid panel 46 and adjacent the lens 18. When the LED 48 is powered by the battery 42, it lights up and projects a visible beam through the lens 18. The LED can be clear or colored.

The walls 41 and 43 extend across the chamber 40 and rigidify the housing 12. The members 45 and 47 provide bases in which are formed threaded apertures 60 and 62, which align with the apertures 20 and 22, respectively through which screws extend to fasten the lid 14 in place. The wall 49 provides a rear support to the battery 42. The top edges of the walls 41, 43 and 49 support the underside of the photovoltaic cell 30 when the cell 30 is clamped between the lid 14 and the upper edges of the walls 41, 43 and 49. Thus, the components of the dock light 10 are held securely in the positions shown in the figures when the dock light 10 is in an operable position, such as mounted to a dock as described below.

Figure 6:
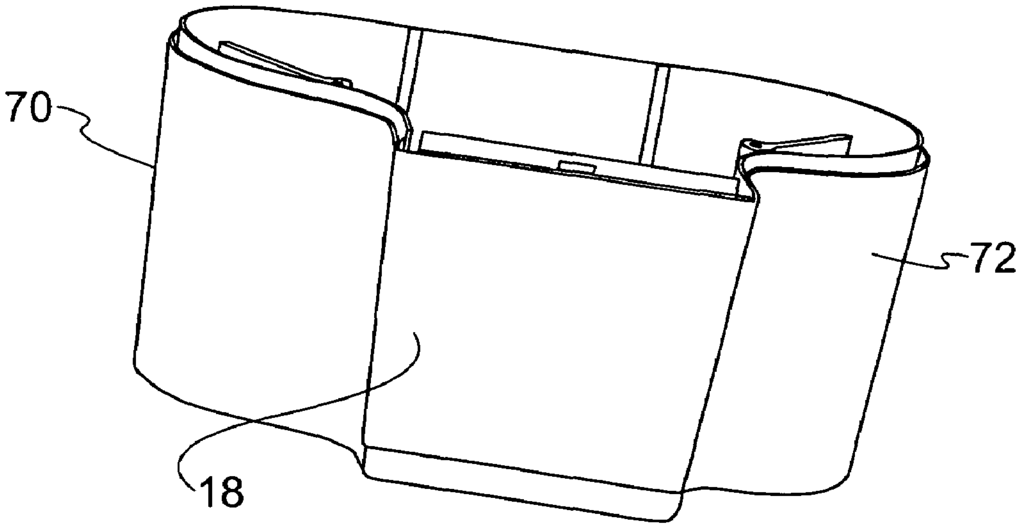
FIG. 6 is a view in perspective illustrating a preferred embodiment of the present invention with the lid and the contents of the chamber removed.
Figure 7:
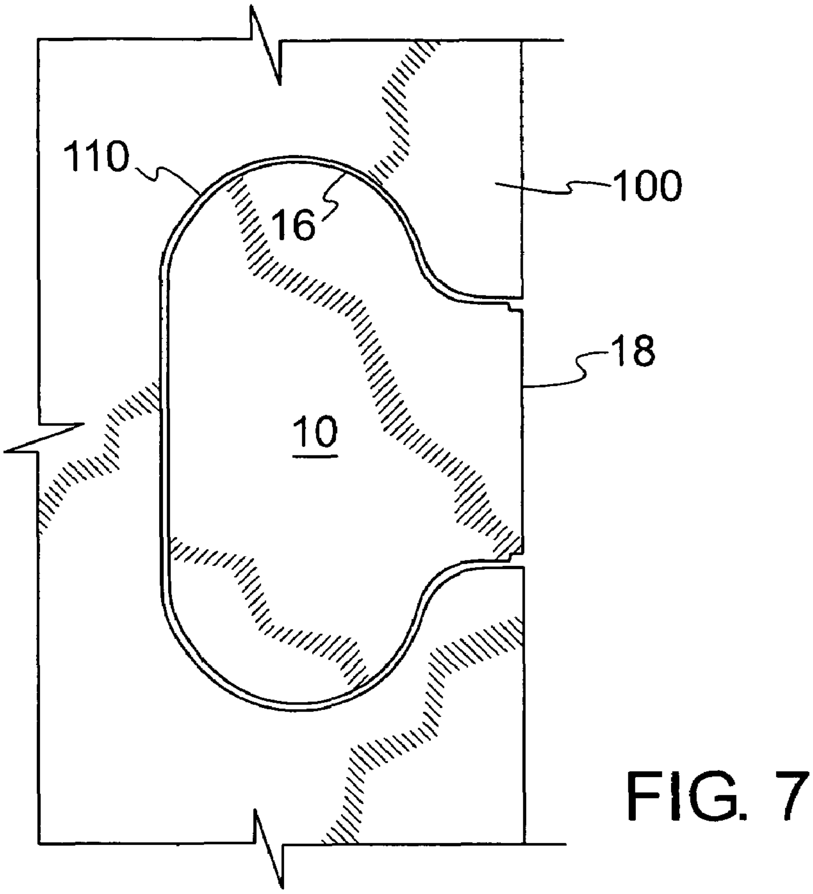
FIG. 7 is a top view illustrating the preferred embodiment of the present invention in an operable position on a dock.

The dock light 10 has a narrowed section near the lens 18, as shown in FIG. 6. This is due to the configuration of the void in the dock 100 into which the dock light 10 is preferably mounted, as shown in FIG. 7. The dock's void has an inwardly facing sidewall 110 that very closely matches the outwardly facing contour of the sidewall 16 of the dock light 10.

Figure 10:
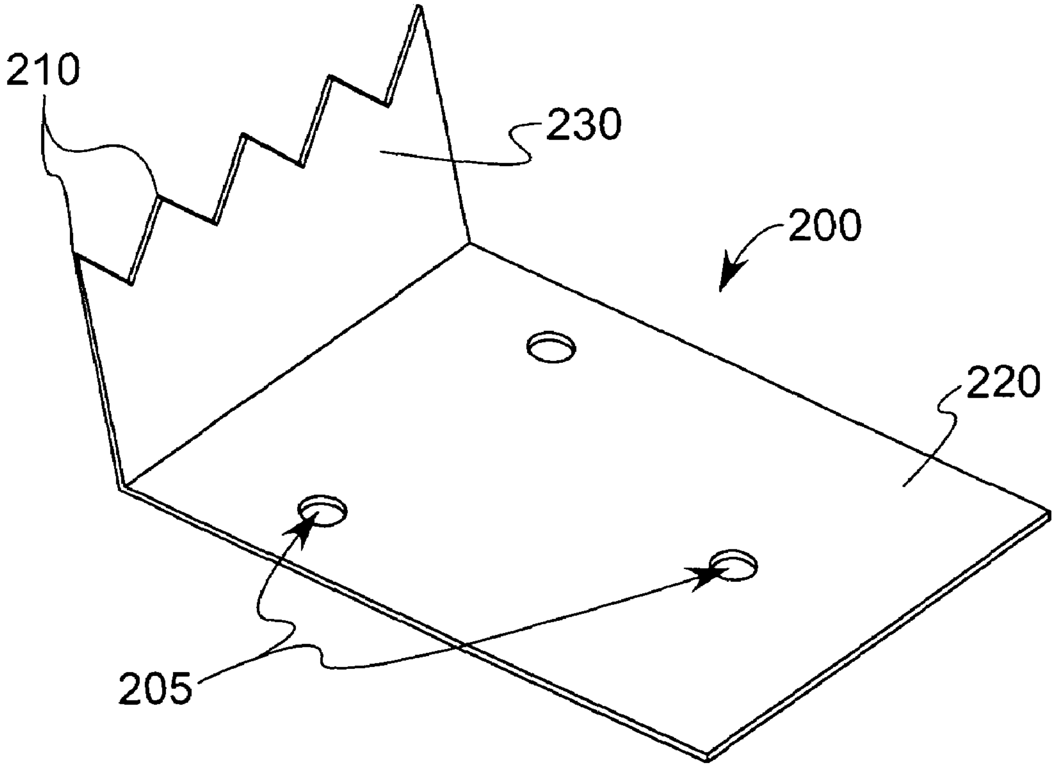
FIG. 10 is a view in perspective illustrating a clip used to hold the dock light in a dock.

It is preferred that the dock light 10 fit into the void of the dock 100 with a gap that is only a fraction of an inch wide so that there is some frictional engagement between the two structures to resist removal of the dock light 10 from the dock 100. In one embodiment, one or more fasteners are driven through the sidewall 16 of the dock light 10 and into the dock 100 to mount the light 10 to the dock 100. In the preferred embodiment, the clip 200 shown in FIG. 10 is mounted to the floor 15 using screws extending through the holes 205 and mounting to the floor 15. The clip 200 is made of spring steel or other flexible, resilient material, and is mounted to the underside of the floor 15 with the large tab 220 parallel to the floor 15 and the smaller tab 230 extending beside the sidewall 16 upwardly and outwardly. The upwardly facing teeth 210 thereby serve as barbs that dig into the sidewall of the dock 100 if the inwardly compressed tab 230 is pulled upwardly with the dock light 10, thereby resisting unintentional removal of the light 10. Of course, other fasteners can be used as will become apparent from the description herein.

Figure 8:
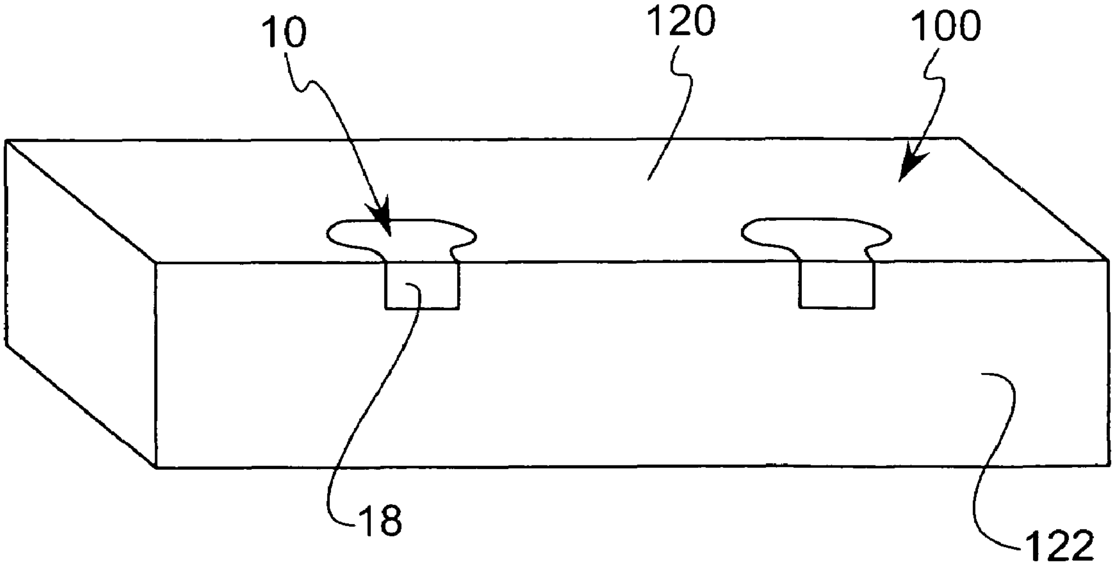
FIG. 8 is a view in perspective illustrating the preferred embodiment of the present invention in an operable position on a dock.

Referring again to FIG. 6, the sidewall 16 extends laterally outwardly from the lens 18 at one side to the widest extreme edge 70. Similarly, the sidewall 16 extends laterally outwardly from the lens 18 at the opposite side to the widest extreme edge 72. The distance between the extreme edges 70 and 72 is substantially greater than the width of the lens 18. This is to conform to the void in the dock 100, which has this same shape. Thus, the dock light 10 can be installed in the dock void by disposing the light 10 above the void and displacing it downwardly (in the illustration of FIG. 8) until its floor seats against the bottom of the void. The lens 18 is preferably slightly narrower than the side opening of the void in the dock 100, as best viewed in FIGS. 7 and 8, in order that the light can be seen through the side opening. The greater width between the extreme edges 70 and 72 prevents the dock light 10 from exiting the dock void through the side opening, and permits exit only through the top opening by reversing the installation steps described above.

The dock 100 has a top surface 120 upon which people can walk when the dock 100 is in an operable orientation, and a side surface 122 that faces the sides of boats when docked against the dock 100. In operation, the lid 14 of the dock light 10 is substantially flush with the top surface 120 of the dock 100 or below it. This configuration keeps the lid 14 from being harmfully contacted by objects that contact the surface of the dock 100, such as shoes and ropes, and permits the photovoltaic cell 30 to collect sunlight for the longest time possible without being shaded by the dock 100. Additionally, the lens 18 is flush with the side surface 122 or below it in order to protect the lens 18 and present the lens 18 the widest field of view so that the LED 48 can be seen from the side.

It will become apparent from the description herein that many other shapes of dock lights are possible. For example, the shape of the preferred embodiment disclosed herein could be made with sharp corners at the wide back to form a rectangular shape rather than curved sides as illustrated. Alternatively, the back could be a pyramid shape with a flat lens, or circular with a lens on one side. The person having ordinary skill will understand from the description above that any of these and many other shapes will work in a manner similar to the preferred embodiment, and can be modified to fit the voids in different docks.

Similarly, the light source is described above as an LED, but could easily be replaced by an incandescent or fluorescent light. Alternatively, one of many light-emitting materials, including chemical-reaction driven and other non-electrical membranes, will suffice. Likewise, although a rechargeable battery with photovoltaic cell are described, the light could be powered by any power source that can supply power to the light source and cause it to emit visible light.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A dock light for inserting into a dock having at least one void formed therein with a top opening in a dock floor and a side opening in a dock sidewall, the dock light comprising:

(a) a housing for mounting into the dock void, the housing having walls defining an internal chamber, the walls including:

(i) a translucent lens for extending into the side opening of the void with at least the lens visible;

(ii) a top wall for extending into the top opening of the void; and (iii) sidewalls substantially wider than the lens for preventing the housing from passing through the side opening;

(b) a light source in the internal housing chamber adjacent the lens; and (c) a power source in the internal housing chamber connected to the light source.

2. The dock light in accordance with claim 1, wherein the sidewalls extend laterally from the lens in a first direction and a second, opposite direction, forming a widened back region opposite the lens.

3. The dock light in accordance with claim 2, wherein the power source comprises a rechargeable battery electrically connected to a photovoltaic cell, and the photovoltaic cell is mounted beneath the top wall.

4. The dock light in accordance with claim 3, wherein the top wall is translucent and removably mounted to the sidewalls.

5. The dock light in accordance with claim 4, wherein the light source is a light emitting diode.

6. The dock light in accordance with claim 5, further comprising a switch mounted to the housing and electrically interposed between the power source and the light source.

7. A dock light combined with a dock having at least one void formed therein with a top opening in a dock floor and a side opening in a dock sidewall, the combination comprising:

(d) a housing mounted into the dock void, the housing having walls defining an internal chamber, the walls including:

(i) a translucent lens extending into the side opening of the void with at least the lens visible;

(ii) a top wall extending into the top opening of the void; and (iii) sidewalls substantially wider than the lens preventing the housing from passing through the side opening;

(e) a light source in the internal housing chamber adjacent the lens; and (f) a power source in the internal housing chamber connected to the light source.

8. The combination in accordance with claim 7, wherein the side opening is narrower than the widest region of the void, and the sidewalls extend laterally from the lens in a first direction and a second, opposite direction, forming a widened back region opposite the lens.

9. The combination in accordance with claim 8, wherein the power source comprises a rechargeable battery electrically connected to a photovoltaic cell, and the photovoltaic cell is mounted beneath the top wall.

10. The combination in accordance with claim 9, wherein the top wall is translucent and removably mounted to the sidewalls.

11. The combination in accordance with claim 10, wherein the light source is a light emitting diode.

12. The combination in accordance with claim 11, further comprising a switch mounted to the housing and electrically interposed between the power source and the light source.

* * * * *